(12) United States Patent
Sandmeyer

(10) Patent No.: US 8,748,554 B2
(45) Date of Patent: Jun. 10, 2014

(54) PRODUCTION OF HIGH-MOLECULAR-WEIGHT SILICONE RESINS

(71) Applicant: Wacker Chemie AG, Munich (DE)

(72) Inventor: Frank Sandmeyer, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/687,112

(22) Filed: Nov. 28, 2012

(65) Prior Publication Data

US 2013/0150547 A1 Jun. 13, 2013

(30) Foreign Application Priority Data

Dec. 7, 2011 (DE) .................. 10 2011 087 931

(51) Int. Cl.
*C08G 77/06* (2006.01)

(52) U.S. Cl.
USPC .................... 528/21; 528/12; 528/13; 528/23

(58) Field of Classification Search
USPC ......................................... 528/12, 21, 23, 14
See application file for complete search history.

(56) References Cited

U.S. PATENT DOCUMENTS

| | | | | |
|---|---|---|---|---|
| 3,450,672 A | | 6/1969 | Merrill | |
| 4,239,877 A | * | 12/1980 | Roedel | 528/14 |
| 4,328,137 A | * | 5/1982 | Medford | 525/474 |
| 5,302,683 A | | 4/1994 | Weidner et al. | |
| 5,338,817 A | * | 8/1994 | Mine et al. | 528/12 |
| 5,457,166 A | * | 10/1995 | Yoshikawa et al. | 525/446 |
| 6,340,735 B1 | * | 1/2002 | Yagihashi | 528/37 |
| 7,601,792 B2 | * | 10/2009 | Higuchi et al. | 528/39 |
| 2008/0255334 A1 | | 10/2008 | Ackermann | |

FOREIGN PATENT DOCUMENTS

| | | |
|---|---|---|
| DE | 854708 A | 11/1952 |
| DE | 1 668 172 | 5/1971 |
| DE | 41 28 893 A1 | 11/1992 |
| DE | 4128893 A1 | 11/1992 |
| DE | 10 2005 047 395 A1 | 4/2007 |
| EP | 1148105 A2 | 10/2001 |
| EP | 2226352 A2 | 9/2010 |
| JP | 649231 A | 1/1989 |
| JP | 05125187 A | 5/1993 |
| JP | 2010112966 A | 5/2010 |
| JP | 2010202731 A2 | 9/2010 |

* cited by examiner

*Primary Examiner* — Margaret Moore
(74) *Attorney, Agent, or Firm* — Brooks Kushman P.C.

(57) ABSTRACT

Silicone resins with a weight average molecular weight of at least 5000 g/mol and polydispersity of ≤65 are prepared by hydrolyzing and condensing:
(A) silicon-bonded alkoxylated and optionally hydroxylated silicone resin intermediate(s),
(C) a basic or acidic catalyst or mixture thereof which is not completely self-neutralizing,
(D) water, and
(E) in the presence of an aliphatic carboxylic ester as the sole process solvent,
with the provisos that
I) alcohol eliminated in the reaction is removed from the reaction mixture by distillation,
II) the catalyst (C) is deactivated by thermal treatment or neutralization, and
III) a portion of (E) remains in the final product.

9 Claims, No Drawings

PRODUCTION OF HIGH-MOLECULAR-WEIGHT SILICONE RESINS

CROSS-REFERENCE TO RELATED APPLICATIONS

This application claims priority to German Patent Application No. 10 2011 087 931.5 filed Dec. 7, 2011 which is herein incorporated by reference.

BACKGROUND OF THE INVENTION

1. Field of the Invention

The invention relates to a process for producing high-molecular-weight silicone resins.

2. Background Art

Numerous publications and patent specifications disclose processes for producing organopolysiloxane resins. The syntheses generally start from chloro- or alkoxysilanes, which are hydrolyzed and condensed. In order to avoid gelling to give insoluble products, a process solvent which is immiscible with the polar aqueous medium is generally added during the synthesis. The solvent dissolves the silicone resin in a non-aqueous phase as it forms, and renders it inaccessible to the condensation catalyst, thus inhibiting gelling. Process solvents that have proven to be ideal are aromatic solvents such as toluene or xylene, technical grades of which generally comprise ethylbenzene.

In this context, reference may be made to DE 1668172 A. The synthesis disclosed uses a mixture of an organic solvent with a cosolvent, in order to obtain a homogeneous hydrolysis mixture, and the process solvent is preferably aromatic, in particular toluene. Another example of a process solvent is n-butyl acetate, and DE 1668172 A indicates that with this solvent, a cosolvent is indispensible The process is restricted to the use of alkoxysilane starting mixtures which are composed of at least 75 mol percent of $CH_3SiO_{3/2}$ units, and the starting silanes comprise both chlorosilanes, alkoxysilanes and alkoxychlorosilanes. The use of chlorosilane-containing mixtures in the presence of water inevitably leads to conditions which cause ester cleavage of n-butyl acetate, and during the course of the reaction it would therefore be impossible to avoid production of butanol, which by reaction with the chlorosilanes would produce unreactive butoxy-functional silicone intermediates, with the possible result that the condensation reaction would cease at low molecular weights. Stabilizing butanol additions are very conventional, specifically for this purpose, in condensable silicone resin preparations. In this connection, reference may be made by way of example to Example 20 in DE 4128893 A1, where butanol is used to adjust the solids content of a condensable siloxane preparation, and a product with stable viscosity is thus obtained. The well-known principle involved is that hydrolytic cleavage of an alkoxysilyl-Si—O—C bond becomes more difficult as the alkyl moiety becomes longer and/or more branched. DE 4128893 A1 utilizes this step to establish a condition of thermodynamic equilibrium which renders the further addition of a stabilizer or inhibitor for adjusting the storage-stability of the resultant products superfluous. Consequently, DE 1668172 A also contains no inventive example with n-butyl acetate as a process solvent.

The process of DE 1668172 A gives solids which crumble easily, with a molar mass Mw of from 1000 to 3500 g/mol, and these are naturally unsuitable for coatings and other applications requiring flexibility.

DE 854708 teaches a process for producing silicone resins via chlorosilane alkoxylation, hydrolysis, and condensation in one step, where an aromatic solvent is added as process solvent, because this helps to inhibit gelling to give insoluble products, which occurs to a particularly large extent in the inventive procedure of DE 854708.

DE 10 2005 047 395 A1 describes a multistage process for producing silicone resins from chlorosilanes by using organic solvents insoluble in water, where "insoluble in water" means that less than 1 g of solvent dissolves in 100 g of water at 25° C. and at a pressure of from 900 to 1100 hPa. However, the examples given in DE 10 2005 047 395 A1 for such solvents to some extent contradict this definition, since acetone and methyl ethyl ketone are also given as possible solvents, and the miscibility or solubility of these in water under standard atmospheric conditions is markedly higher than 1 g/100 g of water. By way of example, the solubility of methyl ethyl ketone is 270 g/l of water. The examples of DE 10 2005 047 395 A1 use only toluene, which, as the sole solvent, is known from DE 854708 to counter gelling due to uncontrolled condensation during synthesis of the resin, and the contradictory information in DE 10 2005 047 395 A1 therefore raises doubts about the usefulness of non-aromatic solvents for the synthesis of methyl- or methylphenylsilicone resins.

DE 4128893 A1 describes the synthesis of silicone resin coating compositions from alkoxy- and silanol-functional silicone resins, silanes, and siloxanes in the presence of a basic condensation catalyst and optionally with solvent or without solvent. The solvent-free syntheses in the alcohol eliminated from the starting materials do not provide high-molecular-weight silicone resins, because of the establishment of an equilibrium between alkoxylation and hydrolysis. In DE 4128893 A1, high-molecular-weight silicone resins are obtained only with xylene as a process solvent. As is obvious from the comparative examples, the process for producing high-molecular-weight silicone resins as in DE 41228893 A1 cannot be used in the solvents given in that document, other than xylene.

Aromatic solvents give cause for concern for operational, environmental, and health-related reasons. Some applications, for example bodycare products, or coating compositions, cannot use products produced in these solvents, or can use them only to a limited extent. On the other hand, aromatic solvents have excellent properties as process solvents for the synthesis of silicone resins. In particular toluene, but also xylene, is almost immiscible with water, but is a very good solvent for silicone resins. They therefore have the ability, during the condensation of alkoxy- or hydroxy-functional siloxane and/or silane precursors, to extract the silicone resins, as they form, from the polar phase into the non-polar phase, and to protect them from excessive condensation extending to gelling, and in many processes they are therefore essential in ensuring that the targeted products are successfully produced.

Apart from alcohols, polar solvents at least to some extent miscible with water can optionally be used as cosolvents in order, if necessary, to achieve homogenization of the reaction mixture or to facilitate phase transfer, and this can be a particular requirement when chlorosilane-containing starting materials are used. In the presence of alcohols, equilibria develop which, as discussed above, inhibit the formation of high molecular weights.

Further to the above, there are no examples of syntheses of high-molecular-weight, soluble silicone resins in polar solvents which are at least to some extent miscible with water, as the sole process solvent. Since the properties of the aromatic solvents are ideally suitable for carrying out syntheses of silicone resins, the expectation per se is that use of polar solvents is not possible, because the property of segregating the silicone resin from the aqueous phase as it forms, and thus protecting it from gelling, is no longer available. However, the restriction of process solvents to aromatics restricts the application range of silicone resins, and their usefulness. This is particularly relevant in the sectors of cosmetics, bodycare, food and drink, medicine, and the construction industry, where typical properties of silicone resins, such as resistance to external weathering, long life, good haptic properties, or transfer resistance would be of great benefit, but these are not used, or are subject to use restrictions, because of health-related concerns about the aromatic solvents used.

SUMMARY OF THE INVENTION

An object of the present invention therefore is to provide a process which can produce high-molecular-weight silicone resins capable of film formation which requires no aromatic solvents, but does not exhibit the disadvantages discussed above, for example gelling. Surprisingly, these and other objects were achieved by a process for producing silicone resins with a molar mass, expressed as weight average Mw, of at least 5000 g/mol and with a polydispersity of at most 65, which comprises hydrolyzing and condensing:

(A) a silicon-bonded alkoxylated silicone resin intermediate or silicon-bonded alkoxylated and hydroxylated silicone resin intermediate, or mixture thereof, with (C) a basic or acidic catalyst that provides basicity or acidity to the mixture, or a mixture of such catalysts which is not completely self-neutralizing, and (D) water, and (E) with an aliphatic carboxylic ester as the sole process solvent, with the provisos that I) the resultant alcohol is removed from the reaction mixture by distillation, and II) the catalyst (C) is deactivated by thermal treatment or by neutralization by way of the addition of an equivalent amount of acid or base, and III) a portion of (E) remains in the final product for viscosity adjustment and solution of the resulting silicone resin that forms.

DETAILED DESCRIPTION OF THE PREFERRED EMBODIMENT(S)

Thus, the invention is directed to a process for producing silicone resins with a molar mass, expressed as weight average Mw, of at least 5000 g/mol and with a polydispersity of at most 65, which comprises hydrolyzing and condensing:

(A) a silicon-bonded alkoxylated silicone resin intermediate or silicon-bonded alkoxylated and hydroxylated silicone resin intermediate, or mixture thereof, with (C) a basic or acidic catalyst that provides basicity or acidity to the mixture, or a mixture of such catalysts which is not completely self-neutralizing, and (D) water, and (E) with an aliphatic carboxylic ester as the sole process solvent, with the provisos that I) the resultant alcohol is removed from the reaction mixture by distillation, and II) the catalyst (C) is deactivated by thermal treatment or by neutralization by way of the addition of an equivalent amount of acid or base, and III) a portion of (E) remains in the final product for viscosity adjustment and solution of the resulting silicone resin that forms.

In another embodiment of the process of the invention, the reaction also uses (B) an alkoxy-functional silane or a mixture of alkoxy-functional silanes, or a mixture of these with hydrolysis and/or condensation products thereof.

The process of the invention permits production of silicone resins with Mw of at least 5000 g/mol, preferably at least 6000 g/mol, more preferably at least 7000 g/mol, and in particular at least 10,000 g/mol, and with polydispersity of at most 65, preferably at most 50, more preferably at most 30, and in particular at most 20.

Polydispersity PD is the quotient Mw/Mn calculated from weight-average molecular weight Mw and number-average molecular weight Mn. Mn and Mw may be determined, for example, by means of size exclusion chromatography (SEC) against a polystyrene standard, in THF, at 40° C., flow rate 1.2 ml/min, and detection by RI (refractive-index detector) on a HR3-HR4-HR5-HR5 Styragel column set from Waters Corp. USA with an injection volume of 100 μl.

Surprisingly, aliphatic carboxylic esters (E) which are at least to some extent miscible with water have been found to be suitable as the sole process solvent, for avoiding gelling while producing high-molecular-weight silicone resins which are storage-stable and capable of film formation. This means not only that the process of the invention uses no aromatic solvents, but also that no solvent mixtures or cosolvents are used.

If the process solvents (E) have sufficiently high boiling points or sufficiently low volatility, the destruction/deactivation of the catalyst (C) in II) can take place thermally, i.e. through heating after the synthesis. If the temperature required for this purpose is too high, or the solvent (E) is too volatile, or its boiling point is too low, the catalyst (C) can be deactivated by neutralization.

It is preferable that the solvent (E) is removed by distillation at atmospheric pressure after the synthesis, while a portion of (E) remains within the product for adjustment to the desired viscosity in III). However, it can also be removed by distillation at reduced pressure.

It is preferable that the temperature required to destroy the catalysts (C) is not exceeded, and the catalyst is instead deactivated by neutralization. In order to avoid premature gelling of the high-molecular-weight reaction products, it is advantageous to select the mildest possible conditions, i.e. in particular minimum temperatures, during work-up. However, the temperature selected for removal of the solvent (E) and of the process alcohol formed by distillation in III) and I) is preferably at least 80° C.

The silicone resin intermediates (A) of the invention are composed of repeating units of the formula (1):

$$R_xSi(OR^1)_yO_{(4-x-y)/2} \qquad (1)$$

where

R are identical or different monovalent, optionally substituted $C_1$-$C_{20}$ hydrocarbon moieties bonded by way of SiC, $R^1$ are identical or different monovalent $C_1$-$C_6$-alkyl moieties or hydrogen, x and y are 0, 1, 2, or 3, with the proviso that x is 1 in at least 30%, preferably in at least 40%, and most preferably in at least 50% of all of the repeating units of the formula (1), and can also be 1 in 100% of all of the repeating units of the formula (1), and the value of x averaged over all of the repeating units of the formula (1) is from 0.9 to 1.9, preferably from 0.95 to 1.9, and more preferably from 1.0 to 1.8, wherein x=1 and x=2 are particularly preferred values for x in the repeating units of the formula (1), and the value of y averaged over all of the repeating units of the general formula (1) is from 0.1 to 1.8, preferably from 0.15 to 1.6, and most preferably from 0.20 to 1.5, where at most 10% by weight, preferably at most 8% by weight, more preferably at most 5% by weight, and in particular at most 3% by weight, of the $OR^1$ units in the silicone resin intermediates made of repeating units of the formula (1) are hydroxy groups.

It is not necessary per se that silanol groups are present in the silicone intermediates made of repeating units of the formula (1). They are produced during the reaction through hydrolysis of the alkoxy groups necessarily present.

The Mw of the silicone resin intermediates (A) made of repeating units of the formula (1) is in the range from 600 to 2500 g/mol with a polydispersity of at most 5. They are liquid, with viscosities in the range from 80 to 600 mPas, preferably from 85 to 550 mPas, and most preferably from 90 to 500 mPas, at 25° C. and atmospheric pressure. Viscosity is determined in accordance with DIN 51562-1. Attendant density is determined in accordance with DIN 51757.

The alkoxy-functional silanes or silane mixtures (B) that can be used in the invention are those of the general formula (2)

$$R^2{}_a Si(OR^3)_b \qquad (2)$$

where $R^2$, independently of R, can be defined as for R, $R^3$, independently of $R^1$, is a moiety of the type stated for $R^1$, a is 0, 1, 2, or 3, b is 4−a, and the preferred ranges of a in a mixture of various silanes of the formula (2), averaged over all of the silanes, are the same as those stated as preferred for x.

In one preferred embodiment, the process is implemented in the absence of (B), in that only the following starting materials are reacted: silicone resin intermediate(s) (A) made of repeating units of the formula (1), a basic or an acidic catalyst (C), and water (D), in (E) as the sole solvent. In a particularly preferred embodiment, a basic catalyst (C) is used.

Selected examples of moieties R are alkyl moieties such as the methyl, ethyl, n-propyl, isopropyl, n-butyl, isobutyl, tert-butyl, n-pentyl, isopentyl, neopentyl, and tert-pentyl moieties, hexyl moieties such as n-hexyl, heptyl moieties such as n-heptyl, octyl moieties such as n-octyl and isooctyl such as 2,2,4-trimethylpentyl, nonyl, such as n-nonyl, decyl such as n-decyl, dodecyl such as n-dodecyl and octadecyl such as n-octadecyl; cycloalkyl moieties such as cyclopentyl, cyclohexyl, cycloheptyl, and methylcyclohexyl moieties; alkenyl moieties such as vinyl; aryl moieties such as the phenyl-, naphthyl-, anthryl-, and phenanthryl moieties; alkaryl moieties such as tolyl, xylyl, and ethylphenyl, and aralkyl moieties such as benzyl and the α- and β-phenylethyl moieties, this list being non-limiting.

R preferably are unsubstituted hydrocarbon moieties having from 1 to 12 carbon atoms, more preferably the methyl, ethyl, n-propyl, and phenyl moieties, and in particular the methyl, n-propyl, and phenyl moieties.

Examples of $R^1$ are the same as for R, where $R^1$ preferably is a hydrogen or a hydrocarbon moiety having from 1 to 6 carbon atoms, more preferably hydrogen, methyl, or ethyl, this list being non-limiting.

Examples of bases that can be used as basic catalysts (C) are hydroxides, methanolates, ethanolates, and isopropanolates, ammonia, amines, alkali metal hydroxides and alkaline earth metal hydroxides, carbonates and hydrogencarbonates of the alkali metals and alkaline earth metals, silanolates and siliconates of the alkali metals, ammonium and phosphonium hydroxides and the respective silanolates of these, and ammonium and phosphonium alkoxides. It is preferable to use, as basic catalyst (C), or as portion of component (C) (if (C) is composed of a mixture), a basic condensation catalyst which, at 0.1 MPa pressure and temperatures of up to 600° C., boils, sublimes, or decomposes with loss of basicity.

Quaternary ammonium and/or phosphonium compounds are particularly suitable as (C), specifically those of the formulae (3) and (4):

$$R^4{}_4 NOR^5 \qquad (3)$$

$$R^6{}_4 POR^7 \qquad (4)$$

where $R^4$ and $R^6$, independently of R, are defined as for R, and $R^5$ and $R^7$, independently of $R^1$, are defined as for $R^1$.

Particularly preferred compounds of the formulae (3) and (4) are the tetra($C_{1-18}$-hydrocarbon)ammonium hydroxides and the tetra($C_{1-18}$-hydrocarbon)phosphonium hydroxides, where the hydrocarbon moieties are in particular alkyl, aryl, alkaryl, and aralkyl moieties. Particular preference is given to the tetra($C_{1-12}$-hydrocarbon)ammonium hydroxides and the tetra($C_{1-18}$-hydrocarbon)phosphonium hydroxides, and/or silanolates of these. The latter are produced via reaction of the quaternary ammonium and phosphonium hydroxides with organosilanes or organosiloxanes.

Particular preference is given to benzyltrimethylammonium hydroxide, which decomposes at 0.1 MPa and 130° C. to give benzyl alcohol and gaseous trimethylamine. Preference is equally given to tetramethylammonium hydroxide. Particular preference is equally given to tetra-n-butylphosphonium hydroxide, which decomposes at 0.1 MPa and 150° C. to give tri-n-butylphosphine oxide and butane, where the latter can escape in gaseous form.

Useful amounts of the basic catalysts (C) are generally from 100 ppm to 1% by weight, preferably less than 0.5% by weight, based on the total weight of the silicone resin intermediate (A). Gaseous or solid catalysts are preferably added to the reaction mixture in alcoholic or aqueous solution. The concentration of these aqueous or alcoholic solutions may be from 5 to 75%, preferably from 10 to 50%, in particular 40%. Particular preference is given to methanolic or ethanolic solutions of benzyltrimethylammonium hydroxide of 40% strength (by weight).

Preferred examples of acids that can be used as acidic catalysts (C) are mineral acids such as hydrochloric acid, nitric acid, or phosphoric acid, hydrochloric acid being particularly preferred, and polyacids such as polyphosphoric acid, polyacrylic acid, and polyvinylsulfuric acid. Carboxylic acids which are preferably used are formic acid, acetic acid, propionic acid, oxalic acid, malonic acid, succinic acid, adipic acid, benzoic acid, phthalic acid, and citric acid. The acidic catalysts (C) are preferably used in amounts of from 1 ppm to 1% by weight, preferably less than 0.1% by weight, based on the total weight of the silicone resin intermediate (A). Gaseous acidic catalysts, such as gaseous hydrochloric acid HCl, or solid acidic catalysts, may be added to the reaction mixture in aqueous solution. The concentration of these aqueous solutions is generally from 5 to 35%, preferably from 10 to 30%, and in particular, about 25%. Particular preference is given to aqueous solutions of hydrochloric acid of 25% strength.

Aliphatic carboxylic esters (E) are those of the formula (5)

$$R^8 C(=O)OR^9 \qquad (5)$$

where

R⁸ are identical or different monovalent linear or branched $C_1$-$C_{30}$-alkyl moieties, $C_1$-$C_{30}$-alkenyl moieties, or hydrogen, where oxygen atoms can replace non-adjacent carbon atoms in the $C_1$-$C_{30}$-alkyl moieties, and R⁹, independently of R⁸, is as defined for R⁸, with the restriction that R⁹ cannot be a hydrogen atom.

Typical, but non-restricting, examples of aliphatic carboxylic esters (E) are methyl, ethyl, n-propyl, isopropyl, n-butyl, isobutyl, and tert-butyl esters, and methoxymethyl, methoxyethyl, methoxypropyl, methoxybutyl, ethoxymethyl, ethoxyethyl, ethoxypropyl, and ethoxybutyl esters of acetic acid, formic acid, propionic acid, or butyric acid, where preference is given to the ethyl, n-propyl, n-butyl, methoxypropyl, and ethoxypropyl esters. Particular preference is given to the ethyl, n-propyl, n-butyl, methoxypropyl, and ethoxypropyl esters of acetic acid, in particular n-butyl acetate and methoxypropyl acetate.

The high-molecular-weight silicone resins produced by the process of the invention have particularly good suitability for use in corrosion-preventing preparations. In particular, they are suitable for use for the purpose of preventing corrosion at high temperature.

The high-molecular-weight silicone resins produced by the process of the invention can be used not only for the purpose of high-temperature-resistant corrosion prevention but also for corrosion prevention for reinforcement steel in reinforced concrete, where the compounds of the invention can be used either in pure form or else in preparations. Corrosion-inhibiting effects are achieved in the reinforced concrete either when the compounds, or preparations comprising these, are introduced into the concrete mixture before this is shaped and hardened or when the compounds or preparations produced in the invention are applied to the surface of the concrete that has already hardened.

The high-molecular-weight silicone resins produced by the process of the invention can be used not only for the purpose of corrosion prevention on metals but also for modifying the properties of preparations or curing products thereof, such as solid bodies or films, for example:

controlling electrical conductivity and electrical resistance
controlling the flow properties of a preparation
controlling the gloss of a moist or cured film or of an object
increasing weathering resistance
increasing chemicals resistance
increasing color stability
reducing susceptibility to chalking
reducing or increasing static and sliding friction on solid bodies or films obtained from preparations comprising the preparation of the invention
stabilizing or destabilizing foam in the preparation comprising the preparation of the invention
improving the adhesion of the preparation comprising the high-molecular-weight silicone resins produced by the process of the invention to substrates onto which, or between which, the preparation comprising the high-molecular-weight silicone resins produced by the process of the invention is applied,
controlling wetting and dispersion behavior in relation to fillers and pigments,
controlling the rheological properties of the preparation comprising the high-molecular-weight silicone resins produced by the process of the invention,
controlling the mechanical properties, e.g. flexibility, scratch resistance, elasticity, extensibility, flexural strength, ultimate tensile strength, resilience, hardness, density, tear-propagation resistance, compression set, behavior at various temperatures, coefficient of expansion, abrasion resistance, and also other properties, such as thermal conductivity, combustibility, gas permeability, resistance to water vapor, hot air, chemicals, weathering and radiation, and sterilizability, of solid bodies or films which comprise the high-molecular-weight silicone resins produced by the process of the invention, or preparation comprising these control of electrical properties, e.g. dielectric loss factor, dielectric strength, dielectric constant, tracking resistance, arc resistance, surface resistance, specific dielectric resistance, flexibility, scratch resistance, elasticity, extensibility, flexural strength, ultimate tensile strength, resilience, hardness, density, tear-propagation resistance, compression set, and behavior at various temperatures, of solid bodies or films obtainable from the preparation comprising the high-molecular-weight silicone resins produced by the process of the invention.

Examples of applications in which the silicone resins produced by the process of the invention can be used in order to modify the properties indicated above are the use in the production of coating materials and impregnation systems, and of coatings and coverings obtainable therefrom, on substrates such as those of metal, glass, wood, minerals, synthetic and natural fibers, for producing textiles, carpets, floor coverings, or other goods that can be produced from fibers, leather, and plastics, such as films, and moldings. With appropriate selection of the preparation components, the silicone resins produced by the process of the invention can also be used in preparations as additives for purposes of defoaming, of promoting flow, hydrophobization, hydrophilization, dispersion of fillers and pigments, wetting of fillers and pigments, substrate wetting, promoting surface gloss, and reducing static and sliding friction on the surface of the hardened composition obtainable from the preparation modified by additives. The high-molecular-weight silicone resins produced by the process of the invention can be incorporated in liquid or in hardened solid form into elastomer compositions. They are used here for reinforcement purposes, or to improve other service properties, an example being control of transparency, of heat resistance, of susceptibility to yellowing, or of weathering resistance. Use in personal care and in homecare, and also in the sector of products for medical applications, is also now possible.

The meanings of all of the above symbols in the above formulae are respectively independent of one another. The silicon atom is tetravalent in all of the formulae.

EXAMPLES

The process of the invention is described below in examples, which however are not intended to restrict the invention. All of the percentage data are based on weight. Unless otherwise stated, all of the operations are implemented at room temperature of about 23° C. and under atmospheric pressure (1.013 bar). The apparatuses involve commercially available laboratory equipment such as that available for purchase from numerous equipment manufacturers.

Ph means a phenyl moiety $=C_6H_5-$
Me means a methyl moiety $=CH_3-$. $Me_2$ correspondingly means two methyl moieties.

Example 1

Reaction of a methylphenylsilicone resin intermediate with average molar mass Mw of 1800 g/mol (number average Mn=900; polydispersity 2.0) and with viscosity of 440 mm²/s, bearing 14.2% by weight of silicon-bonded methoxy groups on the surface, and having the following average composition: 60 mol % of $PhSiO_{3/2}$ units, 36 mol % of $MeSiO_{3/2}$ units, and 4 mol % of $Me_2SiO_{2/2}$ units, with distribution of the methoxy groups over the structural units stated, with benzyltrimethylammonium hydroxide (BTAH) in methoxypropyl acetate in the presence of water:

460.0 g of the silicone resin intermediate are dissolved in 127.5 g of methoxypropyl acetate under nitrogen in a 1 l three-necked flask with reflux condenser and dropping funnel, and 40.0 g of demineralized water and 2.37 g of BTAH in methanol (40% solution) are added to this mixture. The mixture is heated to 80° C. and stirred at this temperature for 2 h.

Volatile constituents of the reaction mixture are then removed by distillation on a rotary evaporator for 3 h without vacuum, where the temperature is increased as far as 131° C. but not higher. The following are then added: as filtration aid, 2.0 g of DICALITE® Perlite filter aid 478, and 3.0 g of Tonsil Optimum 214 FF (Süd Chemie), and the materials are mixed at 131° C. for 30 min on a rotary evaporator, and filtered by way of a pressure filter funnel with a Seitz K 100 filter layer. This gives a clear, slightly yellowish product of very high viscosity with the following properties:

Solvent content: 18.1% by weight of methoxypropyl acetate; amount of remaining methanol detectable as an impurity, only 0.02% by weight.

The residual methoxy content of the product is 2.2% by weight. The methoxy groups are found only in the form of $(Ph)(OMe)SiO_{2/2}$ groups (alkoxylated T unit). No remaining alkoxylated D units $(Me_2(OMe)SiO_{1/2})$ are found.
Mw=30,300 g/mol, Mn=2800, polydispersity Mw/Mn=10.6.

The viscosity of the product proves to be stable on storage for 4 weeks at 60° C. in a drying oven.

When an aluminum panel is coated with the resultant product in a form diluted with methoxypropyl acetate (60:40), a tack-free film is obtained after 4.5 h of storage at room temperature.

Example 2

Reaction of a methylphenylsilicone resin intermediate with average molar mass Mw of 1800 g/mol (number average Mn=900; polydispersity 2.0) and with viscosity of 440 mm²/s, bearing 14.2% by weight of silicon-bonded methoxy groups on the surface, and having the following average composition: 60 mol % of $PhSiO_{3/2}$ units, 36 mol % of $MeSiO_{3/2}$ units, and 4 mol % of $Me_2SiO_{2/2}$ units, with distribution of the methoxy groups over the structural units stated, with hydrochloric acid (25% aqueous solution) in methoxypropyl acetate in the presence of water:

460.0 g of the silicone resin intermediate are dissolved in 127.5 g of methoxypropyl acetate under nitrogen in a 1 l three-necked flask with reflux condenser and dropping funnel, and 40.0 g of demineralized water and 0.4 g of aqueous hydrochloric acid solution are added to this mixture. The mixture is heated to 80° C. and stirred at this temperature for 2 h.

Volatile constituents of the reaction mixture are then removed by distillation on a rotary evaporator for 3 h without vacuum, where the temperature is increased as far as 130° C. but not higher. 300 g of methoxypropyl acetate are then added to the high-viscosity composition, and the following are added: as filtration aid, 2.0 g of DICALITE® Perlite filter aid 478, and 3.0 g of Tonsil Optimum 214 FF (Süd Chemie). 0.4 g of 25% aqueous sodium hydroxide solution are also added, and the materials are mixed at 131° C. for 30 min on a rotary evaporator. The mixture is then filtered by way of a pressure filter funnel with a Seitz K 100 filter layer.

This gives a clear, colorless, viscous solution, which can be concentrated by evaporation to give a dry residue by distillation for 10 min at 120° C. and a pressure of 100 mbar. This gives a cloudy, soft, plastically deformable, non-tacky residue which in turn can be dissolved in methoxypropyl acetate or else in toluene to give a clear solution. Analysis shows that the proportion of methoxypropyl acetate therein is 13.5% by weight. No attempt was made to use distillation to remove this residual solvent from the bulk material. The residual content of methanol in the dry residue was determined as 0.06% by weight. Residual alkoxy content is 1.1% by weight. The methoxy groups are found only in the form of $(Ph)(OMe)SiO_{2/2}$ groups (alkoxylated T unit). No remaining alkoxylated D units $(Me_2(OMe)SiO_{1/2})$ are found.

When the original solution that was obtained after the filtration process has been applied by a 100 μm doctor on an aluminum panel, and the solvent has been evaporated, a dry, tack-free film is obtained after 5 h.

The molar mass of the reaction product is Mw=232,800 g/mol (weight average) with polydispersity (Mw/Mn) of 45.

The viscosity of the solution obtained after the filtration process proves to be stable on storage in a drying oven (4 weeks at 60° C.).

Example 3

Reaction of a methylphenylsilicone resin intermediate with average molar mass Mw of 1030 g/mol (number average Mn=730; polydispersity 1.4) and with viscosity of 140 mm²/s, bearing 12.3% by weight of silicon-bonded methoxy groups and 0.24% by weight of silicon-bonded OH groups on the surface, and having the following average composition: 59 mol % of $PhSiO_{3/2}$ units and 41 mol % of $MeSiO_{3/2}$ units, with distribution of the methoxy groups over the structural units stated, with benzyltrimethylammonium hydroxide (BTAH) and aqueous hydrochloric acid solution (25% solution) in n-butyl acetate in the presence of water:

460.0 g of the silicone resin intermediate are dissolved in 125.5 g of n-butyl acetate under nitrogen in a 1 l three-necked flask with reflux condenser and dropping funnel, and 45.0 g of demineralized water and 2.37 g of BTAH in methanol (40% solution) and 0.2 g of aqueous hydrochloric acid solution are added to this mixture. The mixture is heated to 80° C. and stirred at this temperature for 2 h.

Volatile constituents of the reaction mixture are then removed by distillation on a rotary evaporator for 6 h without vacuum, where the temperature is increased as far as 165° C. but not higher. The following are then added: 0.2 g of 25% sodium hydroxide solution and, as filtration aid, 2.0 g of DICALITE® Perlite filter aid 478, and 3.0 g of Tonsil Optimum 214 FF (Süd Chemie), the materials are mixed at 165° C. for 30 min on a rotary evaporator, and then 200 g of n-butyl acetate are added, and the mixture is filtered by way of a pressure filter funnel with a Seitz K 100 filter layer. This gives a clear, slightly yellowish solution. The solvent can be substantially removed by distillation at 160° C. and 10 mbar for 30 min. About 5% by weight of butyl acetate remain in the high-viscosity residue. The resultant product is in turn readily soluble in n-butyl acetate. The amount of remaining methanol detectable as an impurity is only 0.03% by weight. The residual methoxy content of the product is 1.9% by weight. Viscosity of residue after distillation: 50,800 mm²/s
Mw=30,700 g/mol, Mn=2900, polydispersity Mw/Mn=10.5.

The viscosity of the product proves to be stable on storage for 4 weeks at 60° C. in a drying oven.

When an aluminum panel is coated with the resultant product in a form diluted with n-butyl acetate (60:40) and 1% by weight of Tyzor® Pita transesterification catalyst (titanium ethyl acetoacetate complex; DuPont), a tack-free film is obtained after 3.5 h of storage at room temperature.

Example 4

Reaction of a methylphenylsilicone resin intermediate mixture made of equal proportions by weight of two silicone resin intermediates, where one is a silicone resin intermediate with an average molar mass Mw of 1030 g/mol (number average Mn=730; polydispersity 1.4) and with a viscosity of 140 mm$^2$/s, which bears 12.3% by weight of silicon-bonded methoxy groups and 0.24% by weight of silicon-bonded OH groups on the surface, and which is composed of an average of 59 mol % of PhSiO$_{3/2}$ units and 41 mol % of Me$_2$SiO$_{2/2}$ units, with distribution of the methoxy groups over the structural units stated. The second is a methylphenylsilicone resin intermediate with an average molar mass Mw of 1800 g/mol (number average Mn=900; polydispersity 2.0) and with a viscosity of 440 mm$^2$/s, which bears 14.2% by weight of silicon-bonded methoxy groups on the surface, and which is composed of an average of 60 mol % of PhSiO$_{3/2}$ units, 36 mol % of MeSiO$_{3/2}$ units and 4 mol % of Me$_2$SiO$_{2/2}$ units, with distribution of the methoxy groups over the structural units stated, with benzyltrimethylammonium hydroxide (BTAH; 40% solution in methanol) in methoxypropyl acetate in the presence of water:

230.0 g of each of the two silicone resin intermediates are mixed with 127.5 g of methoxypropyl acetate under nitrogen in a 1 l three-necked flask with reflux condenser and dropping funnel, and 40.0 g of demineralized water and 2.37 g of BTAH in methanol (40% solution) are added to this mixture. The mixture is heated to 80° C. and stirred at this temperature for 2 h. 0.2 g of 25% aqueous hydrochloric acid solution is then added thereto.

Volatile constituents of the reaction mixture are then removed by distillation on a rotary evaporator for 6 h without vacuum, where the temperature is increased as far as 131° C. but not higher. The following are then added: as filtration aid, 2.0 g of DICALITE® Perlite filter aid 478, and 3.0 g of Tonsil Optimum 214 FF (Süd Chemie), and the materials are mixed at 131° C. for 30 min on a rotary evaporator, and filtered by way of a pressure filter funnel with a Seitz K 100 filter layer. This gives a clear, colorless solution, comprising 16.9% by weight of methoxypropanol. The amount of remaining methanol detectable as an impurity is only 0.03% by weight. The residual methoxy content of the product is 5.8% by weight.

Mw=42,500 g/mol, Mn=2200, polydispersity Mw/Mn=19.7.

The viscosity of the product proves to be stable on storage for 4 weeks at 60° C. in a drying oven.

When an aluminum panel is coated with the resultant product in a form diluted with methoxypropanol (60:40) and 1% by weight of Tyzor® Pita transesterification catalyst (titanium ethyl acetoacetate complex; DuPont), a tack-free film is obtained after 3.5 h of storage at room temperature.

Example C5

Comparative Example

Attempt to Synthesize a High-Molecular-Weight Silicone Resin in a Non-Aromatic and Non-Alcoholic Solvent by the Procedure in DE 4128893 A1

Reaction of a methylphenylsilicone resin intermediate with average molar mass Mw of 1030 g/mol (number average Mn=730; polydispersity 1.4) and with viscosity of 140 mm$^2$/s, bearing 12.3% by weight of silicon-bonded methoxy groups and 0.24% by weight of silicon-bonded OH groups on the surface, and having the following average composition: 59 mol % of PhSiO$_{3/2}$ units and 41 mol % of Me$_2$SiO$_{2/2}$ units, with distribution of the methoxy groups and the OH groups over the structural units stated, with benzyltrimethylammonium hydroxide (BTAH; 40% solution in methanol) in acetone in the presence of water:

5.8 g of water and 0.77 g of BTAH, dissolved in methanol, are admixed with 150 g of the silicone resin intermediate in 50 g of acetone under nitrogen in a 1 l three-necked flask with reflux condenser and dropping funnel and stirrer with precision glass gland. The mixture was then heated at reflux (from 60 to 62° C.) for 1 h. The resultant solution was clear, colorless, and free-flowing. Removal of the volatile constituents by distillation was then begun, without vacuum. During this process, the temperature rose to 75° C., and a high-viscosity product formed which accumulated on the upper parts of the stirrer, forcing termination of the procedure. At this juncture, 46 g of distillate had been obtained. The resultant transparent, colorless product is no longer soluble in acetone, alcohols, toluene or xylene.

Example C6

Comparative Example

Attempt to Synthesize a High-Molecular-Weight Silicone Resin in a Non-Aromatic and Non-Alcoholic Solvent by the Procedure in DE 4128893 A1

Reaction of a methylphenylsilicone resin intermediate with average molar mass Mw of 1030 g/mol (number average Mn=730; polydispersity 1.4) and with viscosity of 140 mm$^2$/s, bearing 12.3% by weight of silicon-bonded methoxy groups and 0.24% by weight of silicon-bonded OH groups on the surface, and having the following average composition: 59 mol % of PhSiO$_{3/2}$ units and 41 mol % of Me$_2$SiO$_{2/2}$ units, with distribution of the methoxy groups and the OH groups over the structural units stated, with benzyltrimethylammonium hydroxide (BTAH; 40% solution in methanol) in tetrahydrofuran (THF) in the presence of water:

5.8 g of water and 0.77 g of BTAH, dissolved in methanol, are admixed with 150 g of the silicone resin intermediate in 50 g of THF under nitrogen in a 1 l three-necked flask with reflux condenser and dropping funnel and stirrer with precision glass gland. The mixture was then heated at reflux (from 61 to 63° C.) for 1 h. The resultant solution was clear, colorless, and free-flowing. Removal of the volatile constituents by distillation was then begun, without vacuum. During this process, the temperature rose to 76° C., and a high-viscosity product formed which accumulated on the upper parts of the stirrer, forcing termination of the procedure. At this juncture, 40 g of distillate had been obtained. The resultant virtually transparent, colorless product is no longer soluble in acetone, alcohols, toluene or xylene.

Example C7

Comparative Example

Attempt to Synthesize a High-Molecular-Weight Silicone Resin in a Non-Aromatic and Non-Alcoholic Solvent by the Procedure in DE 4128893 A1

Reaction of a methylphenylsilicone resin intermediate with average molar mass Mw of 1030 g/mol (number average Mn=730; polydispersity 1.4) and with viscosity of 140 mm$^2$/s, bearing 12.3% by weight of silicon-bonded methoxy groups and 0.24% by weight of silicon-bonded OH groups on the surface, and having the following average composition: 59 mol % of PhSiO$_{3/2}$ units and 41 mol % of Me$_2$SiO$_{2/2}$ units, with distribution of the methoxy groups and the OH groups over the structural units stated, with benzyltrimethylammonium hydroxide (BTAH; 40% solution in methanol) in n-hexane in the presence of water:

5.8 g of water and 0.77 g of BTAH, dissolved in methanol, are admixed with 150 g of the silicone resin intermediate in 50 g of n-hexane under nitrogen in a 1 l three-necked flask with reflux condenser and dropping funnel and stirrer with precision glass gland. The mixture was then heated at reflux (70° C.) for 1 h. The resultant solution was whitish and cloudy. Removal of the volatile constituents by distillation was then begun, without vacuum. During this process, the temperature rose to 74° C., and a high-viscosity product formed which accumulated on the upper parts of the stirrer, forcing termination of the procedure. At this juncture, 42 g of distillate had been obtained. The resultant virtually transparent, colorless product is no longer soluble in acetone, alcohols, toluene or xylene.

Example C8

Comparative Example

Synthesis of a silicone resin in xylene by the procedure in DE 4128893 A1.

Reaction of a methylphenylsilicone resin intermediate with average molar mass Mw of 1030 g/mol (number average Mn=730; polydispersity 1.4) and with viscosity of 140 mm$^2$/s, bearing 12.3% by weight of silicon-bonded methoxy groups and 0.24% by weight of silicon-bonded OH groups on the surface, and having the following average composition: 59 mol % of PhSiO$_{3/2}$ units and 41 mol % of Me$_2$SiO$_{2/2}$ units, with distribution of the methoxy groups and the OH groups over the structural units stated, with benzyltrimethylammonium hydroxide (BTAH; 40% solution in methanol) in n-hexane in the presence of water:

5.8 g of water and 0.77 g of BTAH, dissolved in methanol, are admixed with 150 g of the silicone resin intermediate in 50 g of xylene under nitrogen in a 1 l three-necked flask with reflux condenser and dropping funnel and stirrer with precision glass gland. The mixture was then heated at reflux (142° C.) for 1 h. The resultant solution was clear and colorless. 42 g of volatile constituents were then removed by distillation without vacuum. During this process, the temperature rose to 157° C. The solids content of the resultant clear product solution was 83%, and this was adjusted to 80% by adding butanol.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for producing high molecular weight silicone resins with a weight average molar mass Mw of at least 5000 g/mol and with a polydispersity of at most 65, comprising: hydrolyzing and condensing (A) at least one silicon-bonded alkoxylated silicone resin intermediate or silicon-bonded alkoxylated and hydroxylated silicone resin intermediate, or mixture thereof, with
   (C) a basic or acidic catalyst mixture thereof which is not completely self-neutralizing,
   (D) water, and
   (E) in the presence of an aliphatic carboxylic ester as a sole process solvent, with the provisos that
   I) alcohol resulting from hydrolyzing and condensing is removed from the reaction mixture by distillation,
   II) the catalyst (C) is deactivated by thermal treatment or by neutralization, and
   III) a portion of aliphatic carboxylic ester solvent (E) remains in the final product.

2. The process of claim 1, wherein the reaction also employs
   (B) one or more alkoxy-functional silanes or a mixture of alkoxy-functional silanes with hydrolysis and/or condensation products thereof.

3. The process of claim 1, wherein (C) is a quaternary ammonium and/or phosphonium compound.

4. The process of claim 2, wherein (C) is a quaternary ammonium and/or phosphonium compound.

5. The process of claim 1, wherein the aliphatic carboxylic ester (E) is of the formula (5)

$$R^8C(=O)OR^9, \qquad (5)$$

where R$^8$ are identical or different monovalent linear or branched C$_1$-C$_{30}$-alkyl moieties, C$_2$-C$_{30}$-alkenyl moieties, or hydrogen, where oxygen atoms can replace non-adjacent carbon atoms in the C$_1$-C$_{30}$-alkyl moieties, and R$^9$, independently of R$^8$, is as defined for R$^8$, with the restriction that R$^9$ cannot be a hydrogen atom.

6. The process of claim 1, wherein the silicone resin intermediate (A) comprises units of the formula (1)

$$R_xSi(OR^1)_yO_{(4-x-y)/2} \qquad (1)$$

where
   R is an optionally substituted SiC-bonded C$_{1-20}$ hydrocarbon moiety and
   R$^1$ is a C$_{1-6}$ alkyl group or —OH,
   x is 0, 1, 2, or 3,
   y is 0, 1, 2, or 3,
   with the provisos that in 30 mol % or more of the units of the formula (1), x is 1, and x when averaged over all units of the formula (1) is from 0.9 to 1.9; y on average over all units of the formula (1) is between 0.1 and 1.8; and
   the content of OR$^1$ groups in the silicone resin intermediate is at most 10 weight percent based on the total weight of the silicone resin intermediate.

7. The process of claim 6, wherein the silicone resin intermediate has an M$_w$ between 600 and 2,500 g/mol and is a liquid with a viscosity of from 80 to 600 mPas at 25° C.

8. The process of claim 1, wherein the polydispersity M$_w$/M$_n$ of the high molecular weight silicone resin, where M$_n$ is the number average molecular weight, is 30 or less.

9. The process of claim 1, wherein the weight average molecular weight M$_w$ of the high molecular weight silicone resin is at least 10,000 g/mol.

* * * * *